J. A. BASSETT.
PROCESS OF AND MATERIAL FOR CARBURETING GASES.
No. 81,736. Patented Sept. 1, 1868.
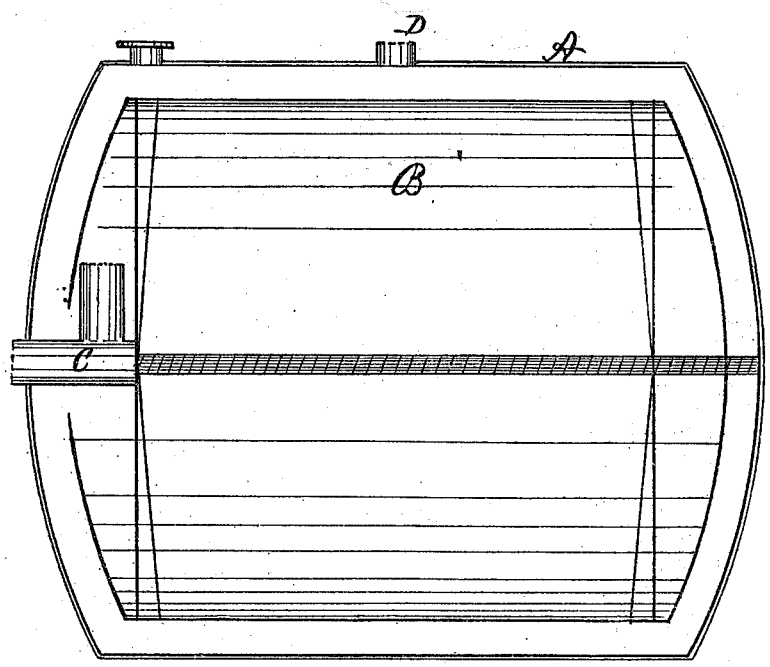

United States Patent Office.

JOHN ALLEN BASSETT, OF SALEM, MASSACHUSETTS.

Letters Patent No. 81,736, dated September 1, 1868.

IMPROVED PROCESS AND MATERIALS FOR CARBURETTING GASES.

The Schedule referred to in these Letters Patent and making part of the same.

TO ALL WHOM IT MAY CONCERN:

Be it known that I, JOHN ALLEN BASSETT, of Salem, in the county of Essex, and State of Massachusetts, have invented a new and useful Improvement in Process and Materials for Carburetting Gases; and I do hereby declare the following to be a full description of the same, reference being had to the drawing which illustrates one of the methods by which my invention may be used, and is a vertical section of the apparatus employed.

I received Letters Patent on the 1st day of January, 1867, in which is described an improved material for filling gas and air-carburetters, No. 60,670. This material is termed "Excelsior," and consists of fibres of wood, separated in the direction of the length of the fibre. The object of this application is to describe a method of more perfectly utilizing the valuable qualities of this material, of increasing its capillary power, and combining with it other substances having absorbent properties.

Some of the capillary materials used for holding hydrocarbon-liquids in suspension are of too dense a structure to permit the free passage of the air or gases through them, after they are saturated with the liquid. Sponge and leather are examples of this class of absorbents, but, on account of their capacity for retaining a large amount of liquid, their use in combination with more porous materials is desirable.

I therefore take the "excelsior," which has a loose and open structure, and retains its porosity in the carburetter perfectly, and mix with it small pieces of sponge, scraps of leather, or small coke. These materials are retained in the fibres of the excelsior, and take up more of the liquid than the excelsior would if used alone, and the excess of liquid taken up saturates the whole mass, and produces a more powerful carburation.

Instead of the "excelsior," cane or other fibre, which has the requisite stiffness and porosity, and which is not liable to be broken down when saturated with hydrocarbon, may be used, and the sponge, or like material, mixed with it. But I prefer, in most instances, to use the excelsior. Fine cotton or flax-fibre may be mixed with it, the whole mass being thoroughly intermingled.

These materials may be used in the apparatus shown, which consists of a case, A, enclosing a wheel, B, divided into compartments by partitions. The capillary material is packed closely in these compartments, and, as the wheel revolves, the mass is successively saturated with the hydrocarbon. The gas enters through the opening C, and, passing through the compartments of the wheel, passes out at the outlet-pipe D. In carburetting coal-gas, the wheel is driven by the pressure of the gas, but in carburetting air, it may be revolved by any suitable power.

The combined capillary material may be used in any of the desirable forms of carburetting-chambers in which capillary agents are employed.

Having thus fully described my invention, what I desire to secure by Letters Patent, is—

1. The combination of absorbent materials having different capillary powers, for the purpose of holding hydrocarbon-liquids in suspension in carbonizing air and gases.

2. Carburetting air or gases by the combined capillary materials described and shown.

3. The apparatus shown and described charged with the materials specified, and used for the purpose set forth.

JOHN ALLEN BASSETT.

Witnesses:
GEO. B. LORING,
H. L. STUART.